United States Patent [19]

Jurek

[11] 4,421,976
[45] Dec. 20, 1983

[54] SYSTEM FOR MONITORING HEATER ELEMENTS OF ELECTRIC FURNACES

[75] Inventor: John J. Jurek, Watertown, Wis.

[73] Assignee: General Signal Corporation, Stamford, Conn.

[21] Appl. No.: 296,666

[22] Filed: Aug. 26, 1981

[51] Int. Cl.³ ............................................... H05B 1/02
[52] U.S. Cl. .................................... 219/506; 219/483; 219/497; 340/640; 340/652; 340/664; 323/246
[58] Field of Search .............. 219/483, 486, 497, 502, 219/506, 485; 340/640, 652, 660, 664; 323/246

[56] References Cited

U.S. PATENT DOCUMENTS

| | | | |
|---|---|---|---|
| 3,924,102 | 12/1975 | Hanekom | 219/497 |
| 4,078,168 | 3/1978 | Kelly | 219/497 |
| 4,162,379 | 7/1979 | Sebers et al. | 219/497 |
| 4,206,552 | 6/1980 | Pomerantz | 219/497 |

FOREIGN PATENT DOCUMENTS

| | | | |
|---|---|---|---|
| 2305910 | 10/1976 | France | 219/483 |
| 935067 | 2/1959 | United Kingdom | 340/640 |

*Primary Examiner*—M. H. Paschall
*Attorney, Agent, or Firm*—Milton E. Kleinman; John Ohlandt

[57] ABSTRACT

A system for monitoring heater elements of electric furnaces so as to identify individual failures, such system comprising an arrangement for detecting the electrical open state of any one of the heater elements, including a current transformer for monitoring current flow; and the capability of monitoring element voltage, such that no element current in the presence of a minimum element voltage is defined as, or taken to be, a failure; further including the provision of a master alarm indication of a defined failure in any of the elements and also an individual alarm indication to indicate which element has failed.

3 Claims, 4 Drawing Figures

SYSTEM FOR MONITORING HEATER ELEMENTS OF ELECTRIC FURNACES

BACKGROUND OF THE INVENTION

This invention relates to a monitoring system for electric furnaces, and more particularly to an electronic system for monitoring individual heater elements so as to detect and identify individual element failures.

It has been known in the art to provide a variety of systems or devices to monitor the condition of electric furnace heater elements. Generally, however, such devices or systems have been expensive or cumbersome and inefficient. For example, one system has utilized electromechanical relays in determining the condition of heater elements, a center tap being required with such an arrangement. Moreover, this arrangement will not work for phase-fired systems. In addition, there has not been appropriate isolation between components of prior art systems.

SUMMARY OF THE INVENTION

It is accordingly a primary object of the present invention to provide a solid state monitoring system for electric furnaces which is extremely efficient, compact, relatively inexpensive, and which provides complete electrical isolation among components.

Another object is to insure that the monitoring arrangement will work with both zero-fired and phase-fired systems, as well as conventional contactors.

Briefly stated, it is a primary feature of the present invention to sense and display one or more heating element failures that may have taken place in an electric furnace. The essential basis of operation of the system is voltage and current monitoring. That is to say, when no current through an element is detected in the presence of a voltage across the same element, this is defined as, or taken to be, a failure. It will be understood that the element must be under power to be tested or monitored for determining whether it is in failure. Also, in order to prevent a spurious alarm, the failure must persist for a minimum time of approximately 1.8 seconds before the failure indication and output are provided.

Accordingly, the present invention may be said to reside in a system for monitoring heater elements of electric furnaces to identify individual failures comprising means for detecting the electrical open state of a heater element, including a current transformer for monitoring current flow; means for monitoring element voltage, such that no element current in the presence of a minimum element voltage over a minimum time is defined as, or taken to be, a failure. Further provided is a means both for providing a master alarm indication of such defined failure and for simultaneously providing individual alarm indications to identify which heater elements have failed.

Thus it will be understood that in accordance with the system of the present invention, a failure is taken to be an opening or break-out of the heater element resulting in interruption of power to the element. As such, over or under current conditions are not taken to be a failure until the condition progresses to a complete open circuit. The system of the present invention is compatible with phase-fired and zero-fired systems, well understood in the art, as well as conventional contactor-controlled furnaces.

In accordance with a more specific aspect of the invention, the system is made up or constituted typically of seven printed circuit boards, four of which contain detector assemblies, whereas two of the boards are lamp driver boards and the remaining circuit board is a master alarm board. Taken together, the seven printed circuit boards make up a 16 point or 16 circuit system. It will be understood, of course, that the system of the invention can be built up or extended to cover much larger numbers of heater elements to be monitored, and to include many more circuits than the sixteen circuits just noted.

Another primary feature of the invention accomplishes the object previously noted of providing suitable isolation. Thus all of the inputs are optically isolated so that they may be connected to any single or polyphasic element configuration without any regard to grounding.

Other and further objects, advantages and features of the present invention will be understood by reference to the following specification in conjunction with the annexed drawing, wherein like parts have been given like numbers.

DESCRIPTION OF PREFERRED EMBODIMENT

Figure 1:
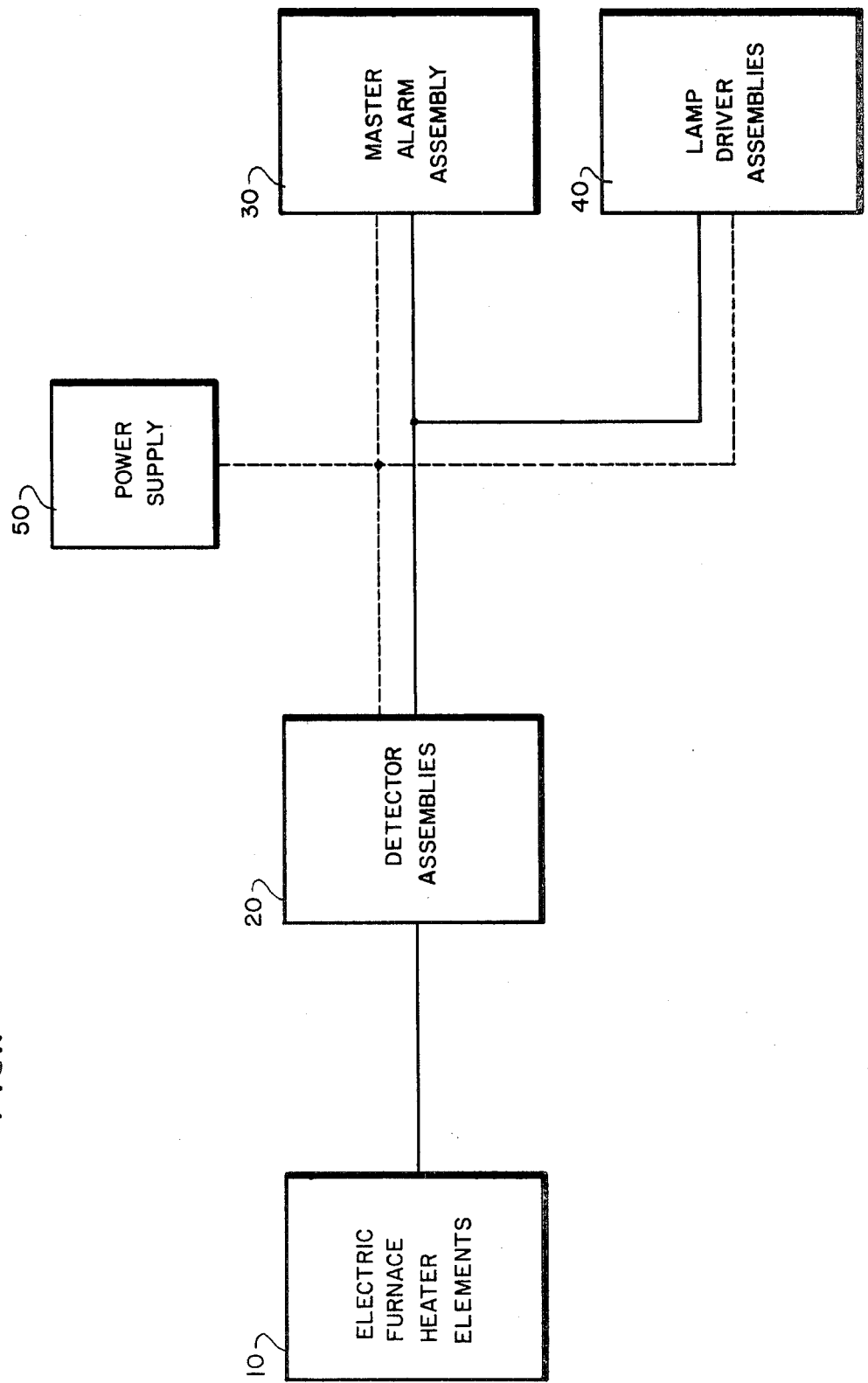
FIG. 1 is a block diagram of the system in accordance with the preferred embodiment of the invention.
Figure 2:
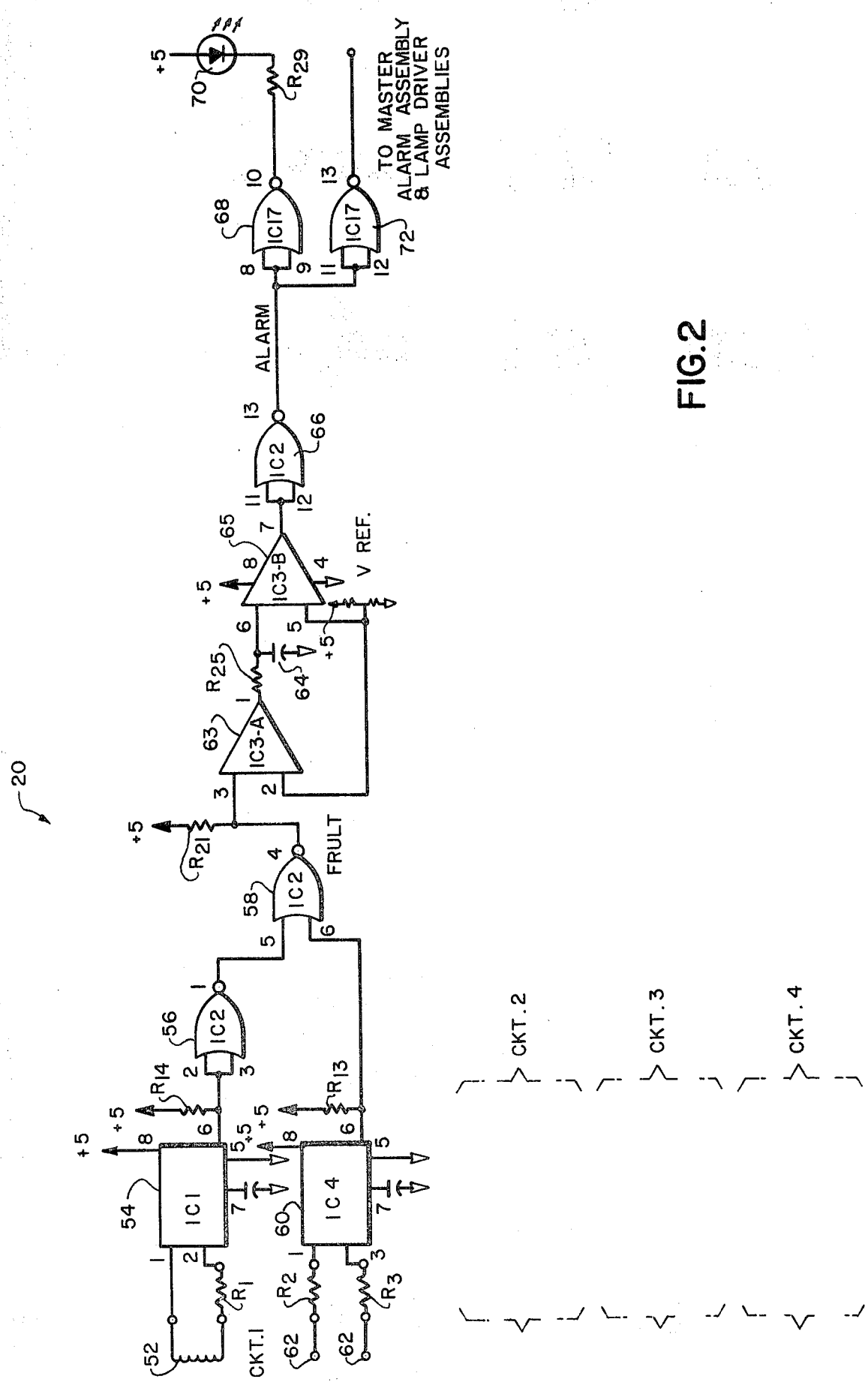
FIG. 2 is a schematic diagram of a detector assembly or assemblies useful in monitoring the condition of electric furnace heater elements.

Referring to the figures of the drawing, and for the moment particularly to FIG. 1, there will be seen a block diagram of the system of the invention. A plurality of electric furnace heater elements 10 are connected by suitable conductors to a number of detector assemblies 20. It is envisioned that a basic system would have sixteen circuits monitoring sixteen individual heater elements. One of these circuits is schematically illustrated in FIG. 2, and three others of the circuits are indicated in such figure. The four circuits depicted in FIG. 2 are contained on an individual printed circuit board so that four of such boards are required for a sixteen circuit system.

Figure 3:
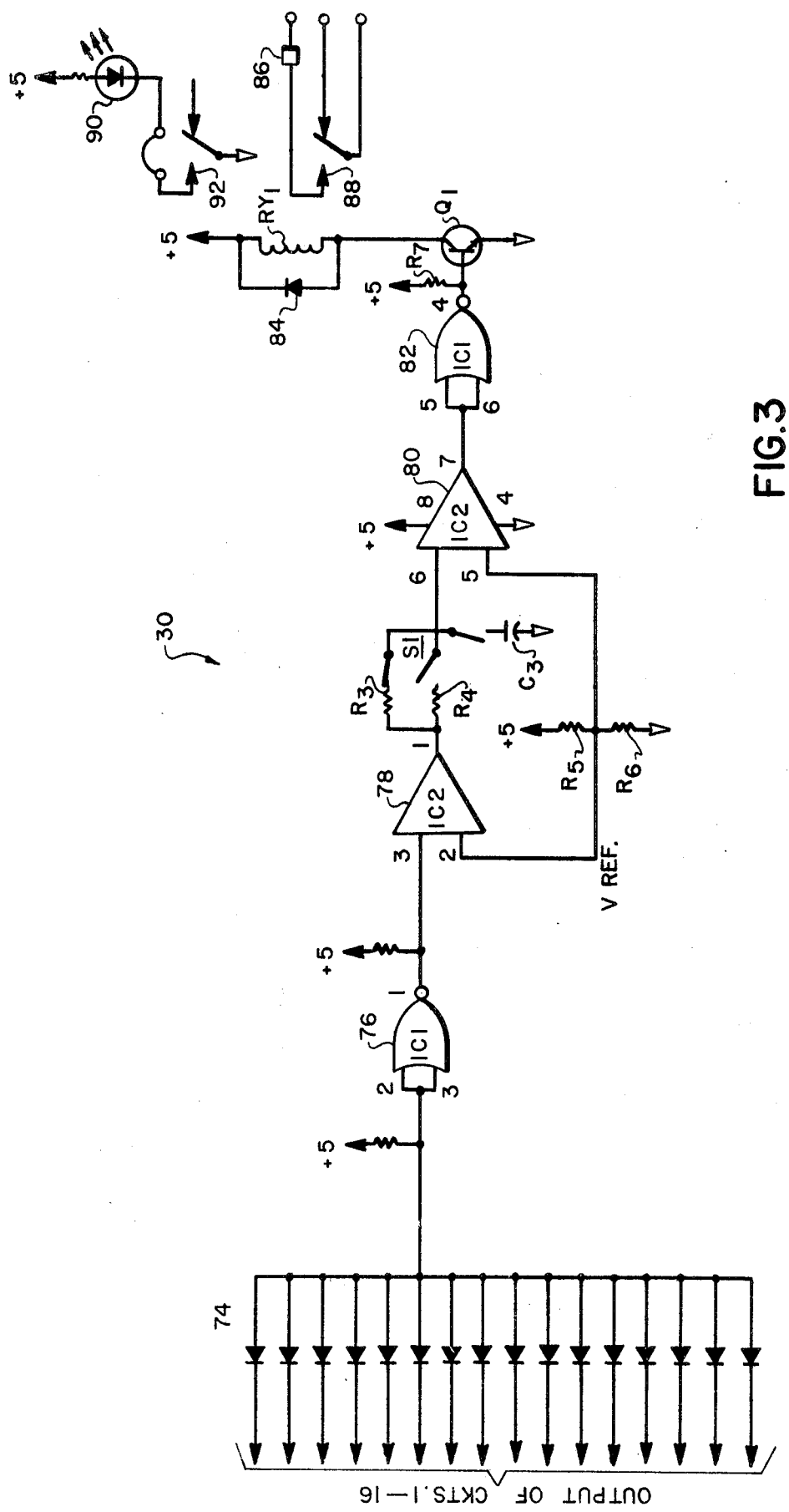
FIG. 3 is a schematic diagram of the master alarm assembly useful in providing an indication of a defined failure in any one of the heater elements.
Figure 4:
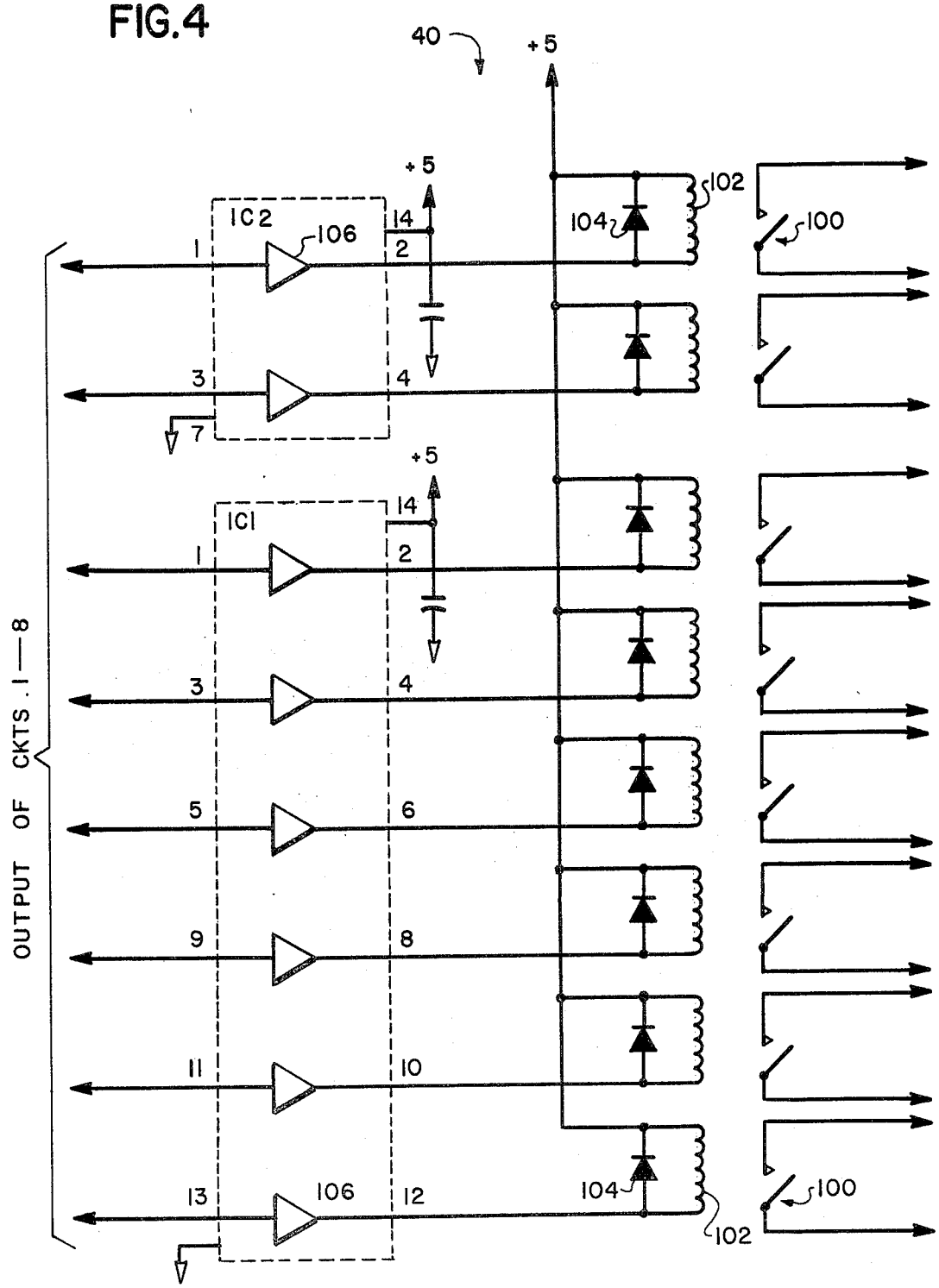
FIG. 4 is a schematic diagram of a typical lamp driver assembly for providing individual remote alarm indications for each of the heater elements.

The outputs from the detector assemblies 20 are connected to the master alarm assembly 30 (FIG. 3) and are also connected to the lamp driver assemblies 40 (FIG. 4). The latter serve the purpose of providing an individual remote alarm indication for each of the heater elements so as to identify a particular failed element; whereas the master alarm assembly is provided so that a master indication can be given of the fact that a failure has occurred in one or more elements.

A power supply 50 is shown connected in FIG. 1 to the several operating assemblies, that is to the detector assemblies, the lamp driver assemblies, and the master alarm assembly. A regulated voltage of +5 VDC is supplied to the solid state components.

Referring now to FIG. 2, there will be seen a circuit No. 1 in schematic form in this figure. A sense coil 52 which is a commercially available standard current transformer is operable to sense the current in a particular heater element. Normally, the current transformer is coupled to the supply line by a single turn. The coil 52 is connected by way of resistor R1 to the inputs at pins 1 and 3 of an opto-coupler integrated circuit device 54 (IC 1). The current input thereto is approximately 25 milliamp rms absolute maximum. Such opto-coupler device provides complete (2250 V rms) electrical isolation between input and output.

It is to be noted that a symbol in parenthesis such as IC1, represents manufacturers' standard designation for solid state integrated circuit components. Also, terminal pins are indicated at the inputs and outputs of such solid circuit components in accordance with manufacturers' schemes so that a particular portion of a large integrated circuit can be appreciated as providing a particular function.

The pins 5 and 7 of opto-coupler 54 are connected in conventional fashion to signal ground as indicated. The +5 supply is connected to pin 8. The output pin 6 is connected to load resistor R14, thence to the joined inputs at pins 2 and 3 of an inverter 56 (IC 2), the output pin 1 of which is connected to input pin 5 of a NOR gate 58. Another input pin 6 of NOR gate 58 is connected to the output of an identical opto-coupler 60 (IC 4).

The input pins 1 and 3 of opto-coupler 60 are utilized for detecting the voltage input, which typically is between 24 and 240 VAC max rms at 100% power. The terminals 62 are connected across the electric heating element whose condition is to be monitored, and to the inputs of opto-coupler 60 by way of resistors R2 and R3. The output pin 6 of opto-coupler 60 is connected to NOR gate 58 (IC 2) via load resistor R13. Resistor values of R1, R2, and R3 are selected from a table to match the particular application voltages, currents, and current transformers employed.

It will thus be understood that when voltage across the furnace element is applied to terminals 62, thence to opto-coupler 60, and the current sense signal from the coil 52 is applied to opto-coupler 54, a failure condition will be indicated at pin 4 of NOR block 58 in the event that there is no current in coil 52 while voltage is present across terminals 62. This follows from the fact that the outputs at pin 6 of each of the opto-couplers go low whenever inputs are present. However, the signal at pin 1 of NOR block 56 is inverted so that lack of current in the furnace element causes a low level at input pin 5 of NOR block 58. Meanwhile, the presence of element voltage causes a low at input 6 so that the two levels result in a high level at pin 4 of NOR block 58. This high level is the fault or failure signal.

The pull-up resistor R21, seen connected to output pin 4 of NOR block 58, allows the full voltage of plus 5 volts at comparator 63 (IC 3-A) which, when compared to V-REF (+2.5 VDC) causes the output at pin 1 to swing high, since input pin 3 is a non-inverting input. Capacitor 64 begins charging through resistor R25. When the voltage at pin 6 of comparator 65 (IC 3-B) exceeds V-REF, after a fixed RC time delay period, the output at pin 7 of comparator 65 goes low. This is inverted at pin 13 of inverter 66 (IC 2) to become the delayed active-high alarm voltage.

It will be understood that the value of the resistor R25 at the output of comparator 63 is selected to obtain a desired delay of approximately 1.8 seconds. This delay is to eliminate false triggering from environmental and line noise, and to allow looser tolerances on circuit components for reasons of economy.

The alarm signal or signals at output pin 13 of inverter 66 are inverted at inverter 68 so as to produce an output to illuminate a light-emitting diode 70, output pin 10 of inverter 68 being connected by way of resistor R29 to the LED 70. Another inverted output is provided by means of inverter 72 so as to supply, at output pin 13 thereof, active low TTL alarm output signals to drive both the master alarm assembly (FIG. 3) and the lamp driver assemblies (FIG. 4) on their respective printed circuit boards.

Referring now to FIG. 3, there will be seen a plurality of sixteen diodes 74 on the left which are shown connected in an OR configuration to the circuits No. 1 through 16. Thus the entire panoply of output signals from each of the output pins 13 of identical inverters 72 from each of the sixteen circuits is connected to the respective diodes 74.

When any of the diodes 74 in the OR configuration depicted is pulled low by reason of any of the alarm outputs being low, or by any external TTL low level or contact closure, the output pin 1 of inverter 76 (IC 1) is pulled up to +5 volts. Consequently, comparator 78 (IC 2) seen connected to the output pin 1 of inverter 76, toggles to the high state since its non-inverting input at pin 3 is now higher than the +2.5 VDC reference voltage (VREF) at pin 2. Capacitor C3 now begins charging through the resistance i.e. either R3 or R4 being selected by means of the switch S1. It is provided as a factory setting that the selection of R3 (100 Kohm) will provide a two second delay. Alternately, the switch S1 can be set to select R4 (10 Kohm) in which case the delay will be 0.2 seconds. An optional delay may be provided by having the user supply or connect his own resistor in a parallel connection. For no delay, capacitor C3 can be disconnected at S1. The particular delay should be selected in accordance with the noise conditions encountered.

In operation, with C3 connected it will charge up towards +5 volts DC. However, when the voltage at input pin 6 of the comparator 80 (IC 2) exceeds the 2.5 reference volts DC at input pin 5 of comparator 80, the output at pin 7 toggles low, delayed about two seconds as previously noted, from receipt of the alarm signal. This delayed signal is inverted at output pin 4 of inverter 82 (IC 1). Output pin 4 is normally low. However, the output of pin 4 now goes high, allowing current from R7 to drive transister Q1 hard into conduction.

Relay RY1, connected in the output circuit of Q1 now becomes operative and pulls in, thereby to activate any external alarms 86 that may be connected. Diode 84 connected in shunt with relay RY1 protects transistor Q1 from inductive overvoltages. In addition to the external alarms 86 being activated by activation of or closure of normally open contact 88, LED 90 is illuminated, thereby indicating an alarm condition. This is accomplished at the same time as activation of the external alarms by closure of similar contacts, that is, normally open contacts 92.

It should be pointed out that other TTL or inputs and outputs can be provided for cascading additional master alarm boards of the same configuration as depicted in FIG. 3 in order that the entire system may be expanded.

Referring now to FIG. 4, there will be seen a portion of the circuitry normally contained within the block 40 depicted in FIG. 1. Thus, only eight circuits designated 1–8 are depicted in FIG. 4, but twice this number would normally be included within the block 40 so that 120 volt AC lamps may be suitably connected to provide a remote indication of alarm conditions for sixteen circuits. These alarm lamps, having a power rating not exceeding 100 watts, would be connected at the outputs of the relay circuits of FIG. 4 so that operation of relay contacts 100 would cause their selective illumination responsive to an alarm active low signal from the output pins 13 of the comparators 72 in the detector assemblies of block 20.

Accordingly, it will be understood that the alarm active-low signals from the detector assemblies 20 (FIG. 2) will drive the associated non-inverting driver inputs of either IC-2 or IC-1 seen in FIG. 4 to pull in the associated reed relay 102 for the respective circuits 1 through 8, thereby closing the aforenoted output contacts 100 with the result already explained. The diodes 104 protect the drivers from inductive high voltages during switching.

It should be explained that individual driver elements 106 are provided within each of the integrated circuits IC-2 or IC-1, such well understood circuit packages being symbolized by the dotted lines.

While there has been shown and described what is considered at the present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

I claim:

1. A system for monitoring heater elements of electric furnaces and the like to identify individual failures, comprising:

a plurality of individual detector circuits, including first means for simultaneously detecting the electrical open state of each of a respective plurality of heater elements, and second means for simultaneously measuring the voltage of each of said heater elements;

said means for simultaneously detecting the open state including a current transformer continuously connected to a respective heater element;

said means for simultaneously monitoring the voltage of each of said heater elements including a voltage detecting pair of terminals continuously connected directly across each heater element;

said first and second means further comprising an opto-coupler integrated circuit device in each of said individual detector circuits;

a first comparison means in each of said detector circuits for comparing, with reference voltage, the resultant signal derived from said current transformer for each heater element and from said voltage detecting pair of terminals for monitoring the voltage of each heater element;

a second comparison means, and a timing means connected between said first and second comparison means to insure that a failure condition must exist for a minimum time for a failure to be indicated;

means for simulltaneously providing a master alarm indication of a defined failure in any one or more of said heater elements;

means for simultaneously providing an individual alarm indication for all of said plurality of heater elements so as to identify particular failed elements, said means including a light-emitting diode in an individual indicator circuit for each of said heater elements.

2. A system as defined in claim 1, in which said means for providing a master alarm indication includes a plurality of diodes in an OR logic configuration connected to the outputs of each of said detector circuits.

3. A system as defined in claim 2 in which said means for providing a master alarm indication includes a light-emitting diode.

* * * * *